US008400675B2

(12) United States Patent
Sonoda

(10) Patent No.: US 8,400,675 B2
(45) Date of Patent: Mar. 19, 2013

(54) IMAGE FORMING APPARATUS, IMAGE FORMING METHOD, COMPUTER READABLE MEDIUM STORING IMAGE FORMING PROGRAM AND RECORDING MEDIUM FOR PERFORMING CONTROL TO CHANGE THE NUMBER OF COLOR MATERIALS USED FOR AT LEAST THE RIM PORTION OF THE RECORDING MEDIUM

(75) Inventor: Tetsuya Sonoda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 726 days.

(21) Appl. No.: 12/568,191

(22) Filed: Sep. 28, 2009

(65) Prior Publication Data

US 2010/0265523 A1 Oct. 21, 2010

(30) Foreign Application Priority Data

Apr. 16, 2009 (JP) ................................ 2009-100074

(51) Int. Cl.
*G06F 3/12* (2006.01)
*G06K 15/00* (2006.01)
*H04N 1/60* (2006.01)
*H04N 15/00* (2006.01)
*H04N 1/40* (2006.01)

(52) U.S. Cl. ...... 358/1.9; 358/1.15; 358/1.18; 358/3.12; 358/3.24

(58) Field of Classification Search .................. 358/1.9, 358/501, 505, 518, 522, 521, 527, 534, 537, 358/539, 426.06, 448, 461, 452, 462, 474, 358/476
See application file for complete search history.

(56) References Cited

U.S. PATENT DOCUMENTS

| | | | | | |
|---|---|---|---|---|---|
| 5,027,197 | A * | 6/1991 | Endo | ............................ | 358/538 |
| 5,140,348 | A * | 8/1992 | Jamzadeh et al. | ............ | 347/115 |
| 5,349,377 | A * | 9/1994 | Gilliland et al. | ............. | 347/131 |
| 5,761,338 | A * | 6/1998 | Kasamatsu | .................. | 382/176 |
| 6,504,628 | B1 * | 1/2003 | Kanno et al. | .................. | 358/522 |
| 6,683,984 | B1 * | 1/2004 | Simske et al. | ................ | 382/190 |
| 7,626,728 | B2 * | 12/2009 | Itagaki et al. | .................. | 358/1.9 |
| 7,742,198 | B2 * | 6/2010 | Yada et al. | .................... | 358/474 |
| 7,970,326 | B2 * | 6/2011 | Ito et al. | ........................ | 399/323 |
| 2003/0117453 | A1 * | 6/2003 | Goto et al. | ...................... | 347/15 |
| 2004/0179103 | A1 * | 9/2004 | Endo et al. | ................. | 348/207.2 |
| 2004/0207875 | A1 * | 10/2004 | Endo | ............................ | 358/1.18 |
| 2005/0099644 | A1 * | 5/2005 | Nomoto et al. | .............. | 358/1.12 |
| 2005/0225779 | A1 * | 10/2005 | Kubota | .......................... | 358/1.2 |
| 2006/0038845 | A1 * | 2/2006 | Kawatoko et al. | .............. | 347/16 |
| 2006/0098219 | A1 * | 5/2006 | Kajihara | ........................ | 358/1.9 |
| 2006/0274376 | A1 * | 12/2006 | Bailey et al. | ................ | 358/3.26 |

(Continued)

FOREIGN PATENT DOCUMENTS

| | | | |
|---|---|---|---|
| EP | 1294174 | A2 * | 3/2003 |
| JP | 2005-070859 | A | 3/2005 |

*Primary Examiner* — Benny Q Tieu
*Assistant Examiner* — Ngon Nguyen
(74) *Attorney, Agent, or Firm* — Sughrue Mion, PLLC

(57) ABSTRACT

An image forming apparatus includes: a determination unit that determines whether or not color materials for image data, more than a predetermined number of color materials, are used for a rim portion of a recording medium to which an image is to be outputted; and a controller that, in correspondence with a result of determination by the determination unit, performs control so as to change the number of color materials used for at least the rim portion of the recording medium to which the image is outputted, to a predetermined or smaller number of color materials, and form the image on the recording medium.

13 Claims, 7 Drawing Sheets

IMAGE FORMING PROGRAM 100

U.S. PATENT DOCUMENTS

2007/0127056 A1* 6/2007 Hirano et al. ................ 358/1.14
2008/0018921 A1* 1/2008 Hori ................................ 358/1.9
2008/0055677 A1* 3/2008 Minamino ..................... 358/514
2008/0291497 A1* 11/2008 Kuwano et al. .............. 358/1.18
2009/0219558 A1* 9/2009 Murakami ..................... 358/1.13
2010/0128290 A1* 5/2010 Fan et al. ........................ 358/1.9

* cited by examiner

S10

S20

S30

IMAGE FORMING APPARATUS, IMAGE FORMING METHOD, COMPUTER READABLE MEDIUM STORING IMAGE FORMING PROGRAM AND RECORDING MEDIUM FOR PERFORMING CONTROL TO CHANGE THE NUMBER OF COLOR MATERIALS USED FOR AT LEAST THE RIM PORTION OF THE RECORDING MEDIUM

CROSS-REFERENCE TO RELATED APPLICATIONS

This application is based on and claims priority under 35 USC 119 from Japanese Patent Application No. 2009-100074 filed Apr. 16, 2009.

BACKGROUND

Technical Field

The present invention relates to an image forming apparatus, an image forming method, a computer readable medium storing an image forming program and a recording medium.

SUMMARY

According to an aspect of the present invention, there is provided an image forming apparatus including: a determination unit that determines whether or not color materials for image data, more than a predetermined number of color materials, are used for a rim portion of a recording medium to which an image is to be outputted; and a controller that, in correspondence with a result of determination by the determination unit, performs control so as to change the number of color materials used for at least the rim portion of the recording medium to which the image is outputted, to a predetermined or smaller number of color materials, and form the image on the recording medium.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described based on the drawings.

Figure 1:
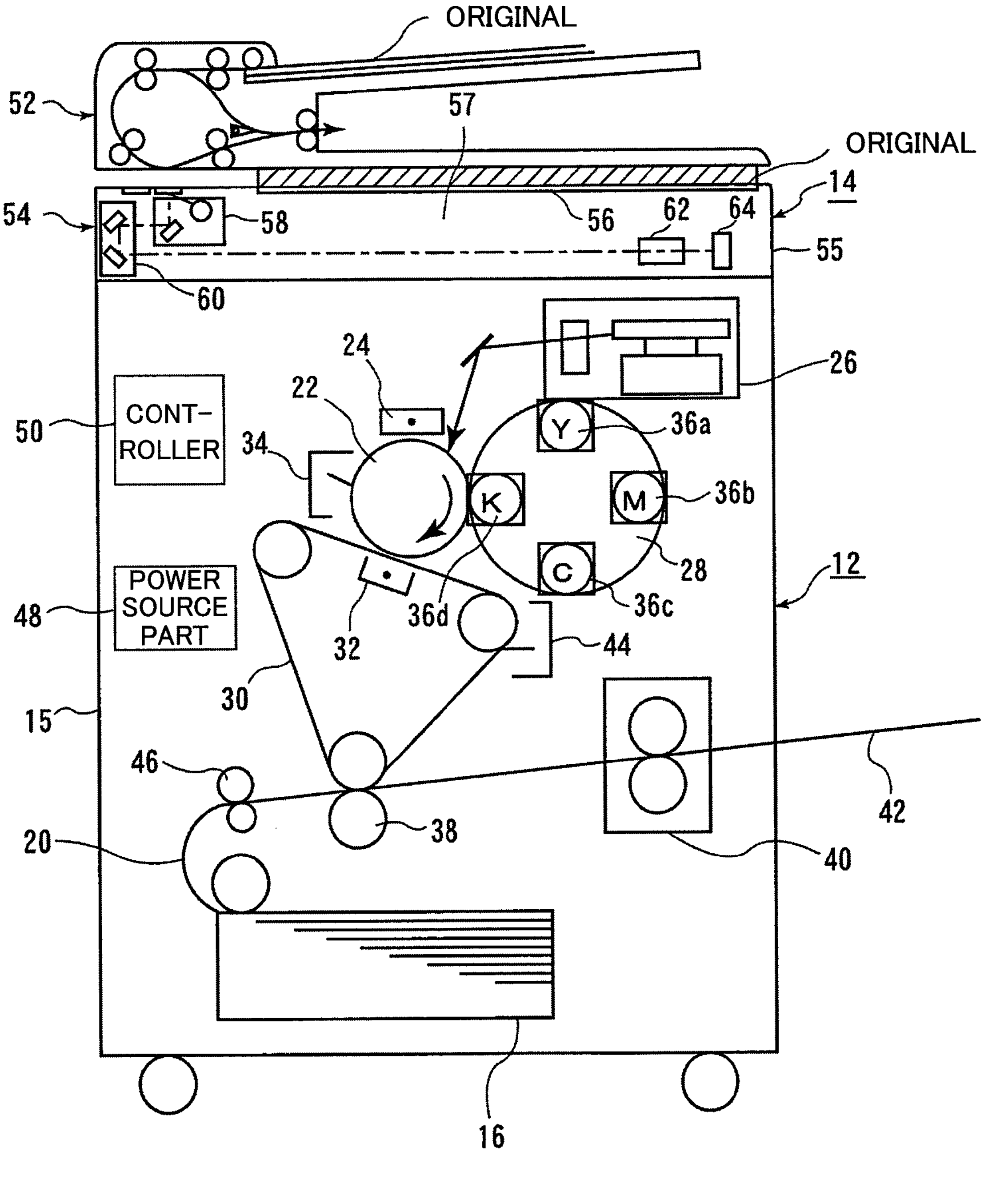
FIG. 1 is a cross-sectional view schematically showing an image forming apparatus according to an exemplary embodiment of the present invention.

FIG. 1 is a cross-sectional view schematically showing an image forming apparatus 10 according to the exemplary embodiment of the present invention. The image forming apparatus 10, which is e.g. an electrophotographic apparatus for color image formation, has an image forming part 12 and a document reader 14. The image forming part 12, having e.g. an image forming apparatus main body 15 and a paper supply tray 16 on which recording media such as paper are stacked, forms an image on the recording medium supplied from the paper supply tray 16 to a recording medium conveyance passage 20.

That is, the image forming part 12 has a photoreceptor 22 as an image carrier, a charger 24 to uniformly charge the photoreceptor 22, an illumination device (optical writing device) 26 to form a latent image on the photoreceptor 22 uniformly charged by the charger 24, a developing device 28 to visualize the latent image formed by the illumination device 26 on the photoreceptor 22 with toner (developer), a first transfer device 32 to transfer the toner image formed by the developing device 28 onto an intermediate transfer belt 30, and a photoreceptor cleaner 34 to clean toner remaining on the photoreceptor 22. The illumination device 26, which is e.g. a laser scan type device, outputs image data outputted from e.g. a host computer (see FIG. 2) as laser on/off. The illumination device 26 may perform illumination using an LED. The developing device 28, which is e.g. a rotary device, has Y (yellow), M (magenta), has C (cyan) and K (black) color developing units 36*a* to 36*d* in its peripheral positions. During development of each color, the developing device 28 rotates to move the corresponding color developing unit to a position opposite to the photoreceptor 22. The first transfer device 32, which is e.g. a corotron type charger, transfers the four color toner images onto the intermediate transfer belt 30. The toner image transferred on the intermediate transfer belt 30 is transferred onto a recording medium by a second transfer device 38. The recording medium is sent to a fixing device 40, and the toner image is fixed by the fixing device 40 to the recording medium. The recording medium to which the toner image is fixed is charged to a discharge tray 42. The toner remaining on the intermediate transfer belt 30 is scraped off by an intermediate transfer belt cleaner 44.

A registration roller 46 is provided on the recording medium conveyance passage 20. The registration roller 46 temporarily stops a supplied recording medium, and in synchronization with timing of formation of toner image on the intermediate transfer belt 30, supplies the recording medium to the second transfer device 38.

Note that a power source part 48 to supply electric power to the respective electronic devices as constituent elements of the image forming apparatus 10 and a controller 50 to control the respective constituent elements of the image forming apparatus 10 are provided in the image forming apparatus main body 15.

The document reader 14 has an automatic document feeder 52 and an optical system 54 to optically read an original. The document reader 14 has a function of skimming through an original (image) fed by the automatic document feeder 52 and a function of reading an original (image) placed on a platen glass 56.

The optical system 54 has an optical system main body 55 having e.g. a box shape, and has a full rate carriage 58, a half rate carriage 60, a lens 62 and a photoelectric conversion element 64 in the optical system main body 55. The full rate carriage 58, with an original subscanning direction (from the left side to the right side in FIG. 1) as a scanning direction, makes full-stroke movement in the scanning direction in stroke space 57 in the document reader 14. The half rate carriage 60 makes a half-stroke movement in the subscanning direction in the stroke space 57.

The lens 62 receives reflected light from light, emitted from the full rate carriage 58 on an original placed on the platen glass 56 provided above a moving range of the full rate carriage 58 and the half rate carriage 60, an original passing through a conveyed original reading position, or the like, via the half rate carriage 60, and forms an image.

The photoelectric conversion element 64 is e.g. a 3-line color CCD to receive the reflected light in an image formation position of the reflected light by the lens 62, and output an analog electric signal corresponding to respective RGB light quantities by pixel, obtained by a photodiode having e.g. RGB filters (primary color filters), to e.g. the controller 50.

Figure 2:
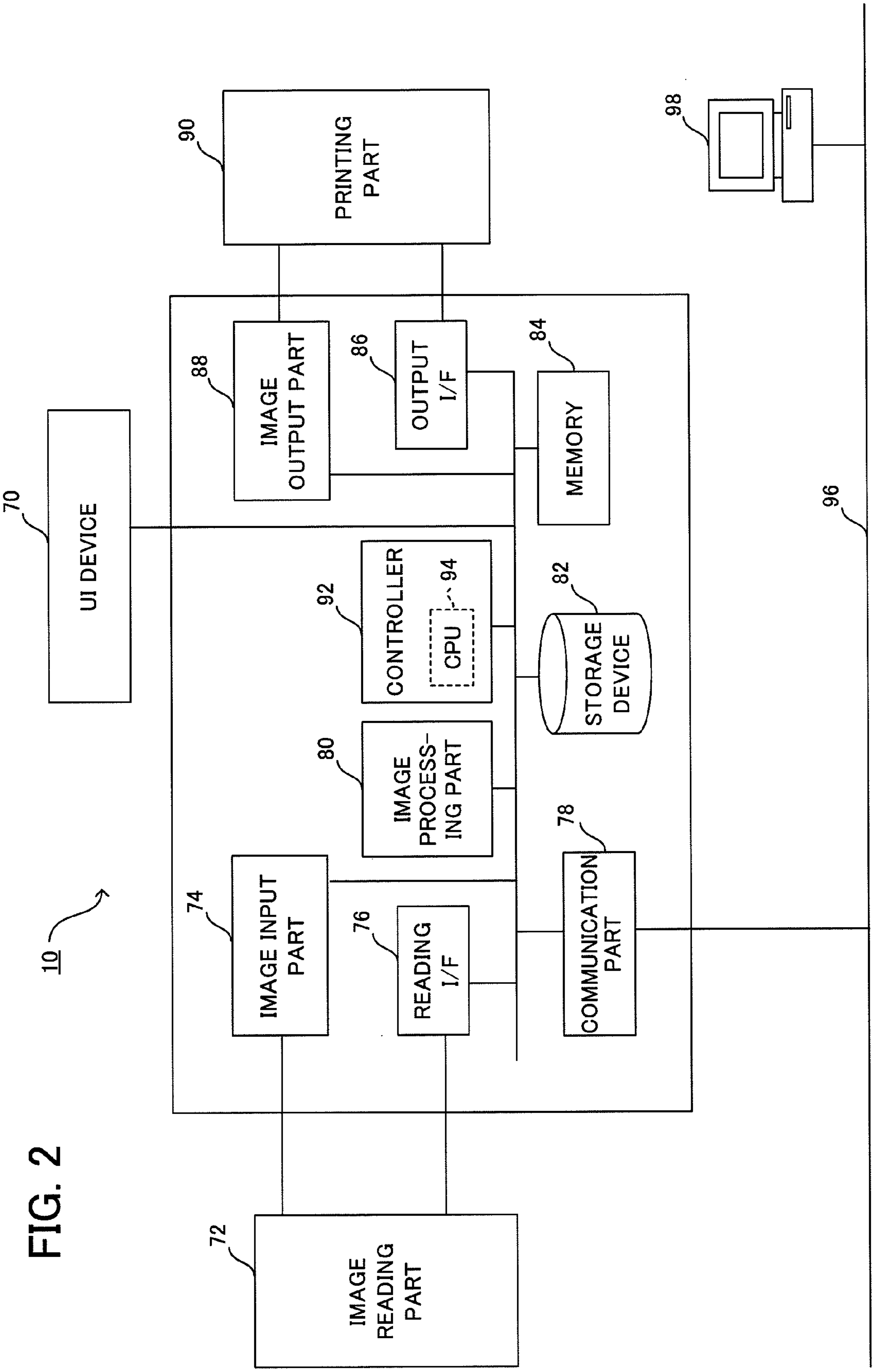
FIG. 2 is a block diagram showing a configuration of the image forming apparatus.

FIG. 2 is a block diagram showing a configuration of the image forming apparatus 10.

The image forming apparatus 10 has e.g. a user interface (UI) device 70, an image reading part 72, an image input part 74, a reading interface (I/F) 76, a communication part 78, an image processing part 80, a storage device 82, a memory 84, an output interface (I/F) 86, an image output part 88, a printing part 90 and a controller 92. The image forming apparatus 10 is connected to a host computer 98 via e.g. a network 96.

The UI device 70, having e.g. a touch panel, receives an input such as an instruction from an operator (user), and produces a display for the operator. The image reading part 72, corresponding to the above-described document reader 14, reads an image of an original or the like, and outputs read image data to an image input part 74. The image input part 74, connected to the image reading part 72 via the reading I/F 76, receives the image data read by the image reading part 72, or the like, as an input image, and outputs the image data to e.g., the storage device 82. The communication part 78 connects the image forming apparatus 10 with the host computer 98 via the above-described network 96. The image processing part 80 performs image processing including image compression, image expansion, composition and the like. The storage device 82 holds control information, setting information, a program and the like for the image forming apparatus 10 to operate. The image output part 88 maps the image processed by the image processing part 80 or the like to an output image, and outputs the mapped image via the output I/F 86 to the printing part 90. The printing part 90, having the above-described photoreceptor 22, the charger 24, the illumination device 26, the developing device 28 and the like, forms an image on a recording medium such as paper.

The controller 92, including a CPU 94 and the like, controls the respective constituent elements of the image forming apparatus 10. In this manner, the image forming apparatus 10, having a function as a computer, executes a predetermined program, thereby forms an image on a recording medium.

Note that in the present specification, the color expressed with an image formed using one of the Y (yellow), M (magenta), C (cyan) and K (black) color toners, which can be visualized by the developing device 28, is represented as a "single color".

Figure 3:
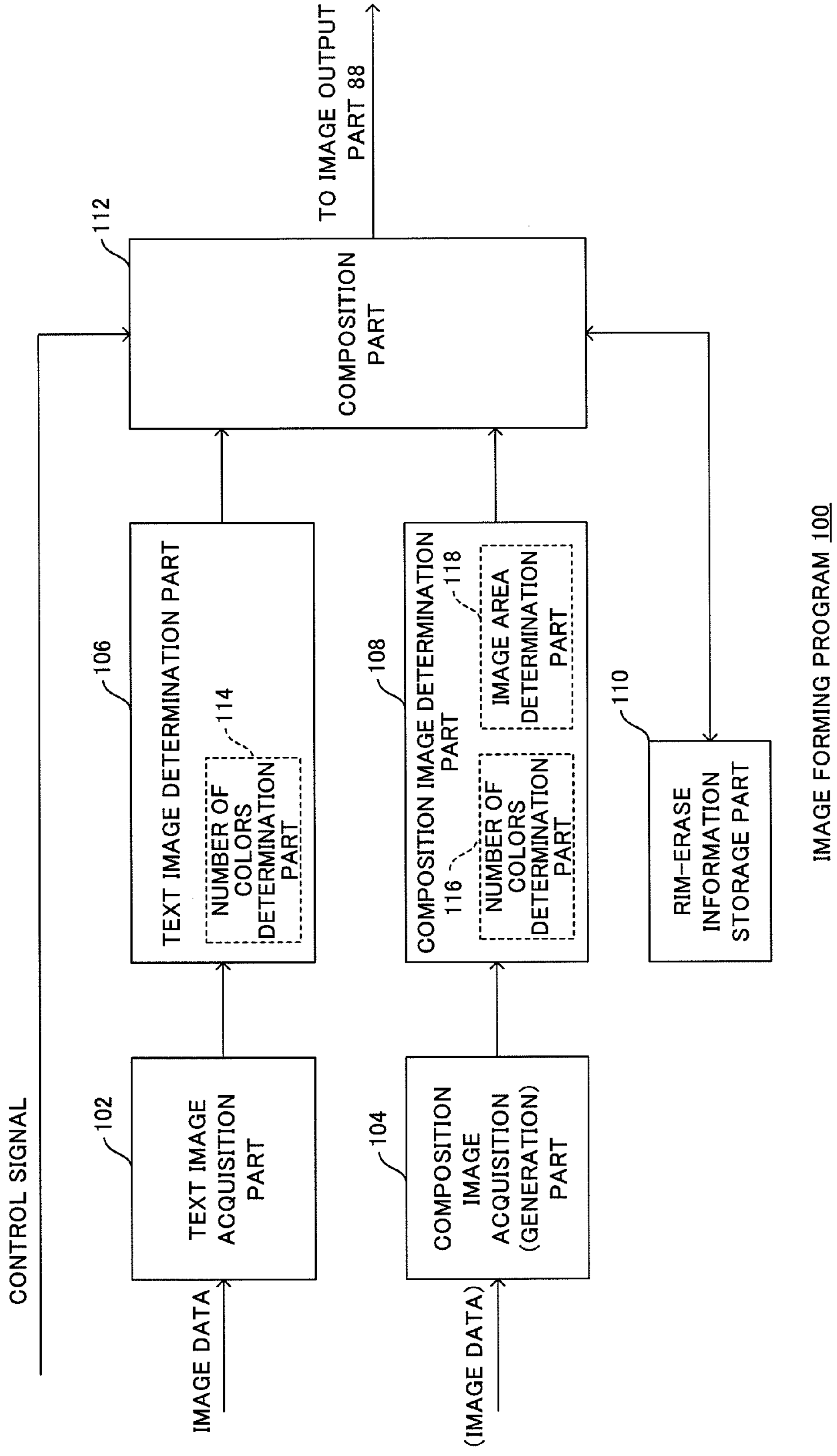
FIG. 3 is a block diagram showing an example of a structure of an image forming program executed by a CPU.

FIG. 3 is a block diagram showing an example of a structure of an image forming program 100 executed by the CPU 94.

As shown in FIG. 3, the image forming program 100 has a text image acquisition part 102, a composition image acquisition (generation) part 104, a text image determination part 106, a composition image determination part 108, a rim-erase information storage part 110 and a composition part 112.

The text image acquisition part 102 obtains image data such as PDL (Page Description Language) to form an image (text image) as text (major portion) of an image formed on a recording medium, transmitted via e.g. the network 96 from the host computer 98, and outputs the obtained data to the text image determination part 106.

The composition image acquisition part 104 obtains image data described using such as PDL (Page Description Language) to form an image as a background image (composition image) of an image formed on the recording medium, transmitted via e.g. the network 96 from the host computer 98, and outputs the obtained data to the composition image determination part 108. Further, it may be arranged such that the composition image acquisition part 104 generates image data to form an image including a code such as a duplication prevention code, as a background image (composition image) to be formed in a predetermined size of the recording medium, and outputs the generated image data to the composition image determination part 108.

The text image determination part 106 has a number of colors determination part 114. The number of colors determination part 114 receives the image data outputted from the text image acquisition part 102, and determines whether or not the number of toner colors (number of uses) in the developing device 28 utilized for representation of a color indicated with the image data for formation of a text image is equal or smaller than a predetermined number. For example, the number of colors determination part 114 determines whether or not the number of uses of toner color is "1" (or equal to or smaller than "1") (in other words, single color or not). Then, the text image determination part 106 outputs the image data, with the result of determination by the number of colors determination part 114, to the composition part 112.

The composition image determination part 108 has a number of colors determination part 116 and an image area determination part 118. The number of colors determination part 116 receives the image data outputted from the composition image acquisition part 104, and determines whether or not the number of toner colors (number of uses) in the developing device 28 utilized for representation of a color indicated with the image data for formation of the composition image, is equal to or smaller than a predetermined number. For example, the number of colors determination part 116 determines whether or not the number of uses of toner colors is "1" (or equal to or smaller than "1") (single color or not). The image area determination part 118 determines whether or not a valid area of an image formed in correspondence with the image data outputted from the composition image acquisition part 104 (area in which an image using toner is formed) can be set within an area except a predetermined rim portion of the recording medium. Then, the composition image determination part 108 outputs the image data, with the results of determination by the number of colors determination part 116 and the image area determination part 118, to the composition part 112.

The rim-erase information storage part 110 holds information indicating areas to be predetermined rim portions of plural predetermined recording media, and in accordance with a request from the composition part 112, outputs information indicating the areas to be rim portions (rim-erase information) to the composition part 112.

The composition part 112 receives a predetermined control signal outputted from the CPU 94, the result of determination by the number of colors determination part 114 and the image data outputted from the text image determination part 106, the results of determination by the number of colors determination part 116 and the image area determination part 118 image data outputted from the composition image determination part 108, and image data, and the rim-erase information from the rim-erase information storage part 110, generates composite image data for a predetermined sized recording medium, and outputs the composite image data to the image output part (FIG. 2). The control signal received by the composition part 112 from the CPU 94 includes rim-erase instruction information instructing the composition part 112 to generate composite image data obtained by performing rim-erase processing on entire image data indicating a full-page color image, in correspondence with the rim-erase information stored in the rim-erase information storage part 110, as standard processing information (in other words, as default information). That is, upon reception of an instruction to form a color image by full-page printing on a recording medium, the image forming apparatus 10 forms a rim-erased color image as a default. Note that even when the composition part 112 receives rim-erasing instruction information from the CPU 94, the composition part 112 generates composite image data including an image not to be subjected to rim-erase processing (rim-erase invalidated image) on a predetermined condition, in correspondence with the results of determination received from the text image determination part 106 and the composition image determination part 108. For example, the CPU 94 turns on/off rim-erase invalidating flags for image data for a text image and image data for a composition image independently, thereby invalidates the rim-erasing instruction information (in other words, invalidates the rim-erase processing) for the image data for the text image and the image data for the composition image.

Next, an example of image formation performed by the image forming apparatus 10 will be described.

Figure 4:
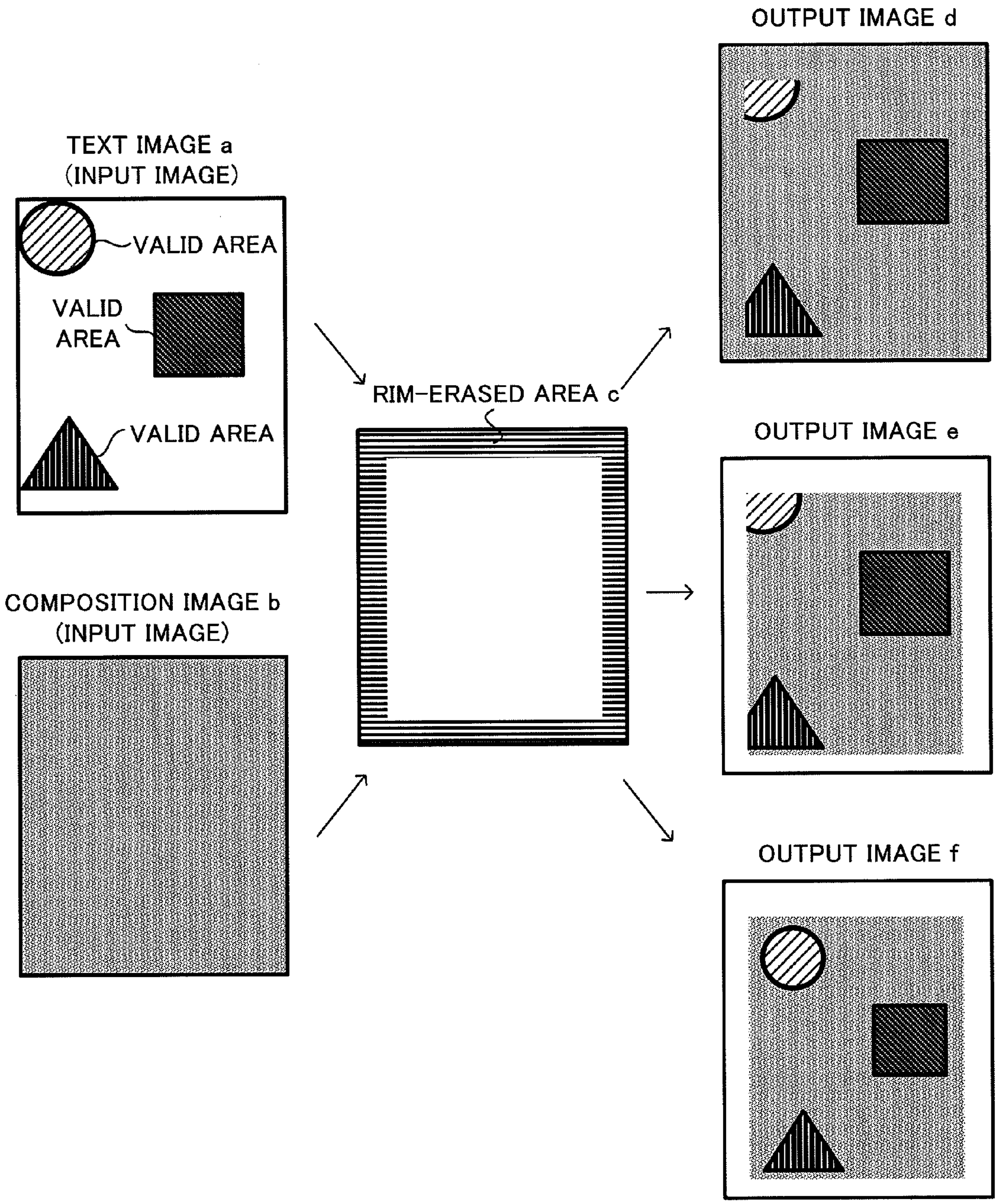
FIG. 4 is a conceptual diagram showing an example of processing performed in execution of the image forming program by the image forming apparatus.

FIG. 4 is a conceptual diagram showing an example of processing performed in execution of the image forming program 100 by the image forming apparatus 10.

As shown in FIG. 4, the image forming apparatus 10 obtains a text image a corresponding to e.g. A4 size and a composition image b including a code such as a duplication prevention code, corresponding to e.g. A4 size, respectively as input images. The text image a, which is a color image, has e.g. three valid areas (areas in which images using toner are formed) and a non-image area (area within an image formation area corresponding to recording medium size where an image using toner is not formed). A rim-erased area c is a predetermined rim portion of an A4-sized recording medium. When the CPU 94 receives an instruction to form a color image for full-page printing on an A4-sized recording medium, the rim-erased area c is subjected to rim-erase processing as a default.

When the composition image b is the above-described single color image, in the image forming program 100, the text image determination part 106 determines that the text image a is not a single color image and the composition image determination part 108 determines that the composition image b is a single color image, then the composition part 112 outputs an output image d obtained by composing the text image a subjected to the rim-erase processing in accordance with the rim-erased area c with the rim-erase invalidated composition image b.

When the composition image b is not a single color image, in the image forming program 100, the text image determination part 106 determines that the text image a is not a single color image and the composition image determination part 108 determines that the composition image b is not a single color image, and the composition part 112 outputs an output image e obtained by composing the text image a subjected to the rim-erase processing in accordance with the rim-erased area c with the composition image b subjected to the rim-erase processing in accordance with the rim-erased area c.

Note that as a comparative example, when the above-described rim-erase processing is not invalidated even though the composition image b is a single color image, the output image e is generated.

Further, it may be arranged such that, when the composition image b is not a single color image, in the image forming program 100, in order to form an image on a recording medium without omission of the code included in the composition image b, an output image is generated so as to form the composition image b inside the rim-erased area c by reducing the composition image b.

Further, it may be arranged such that, when neither the text image a nor the composition image b is a single color image, in the image forming program 100, in order to form an image on the recording medium without omission of the text image a and the composition image b, the text image a and the composition image b are reduced, thereby an output image f, obtained by composing the text image a and the composition image b, inside the rim-erased area c, is outputted.

Figure 5:
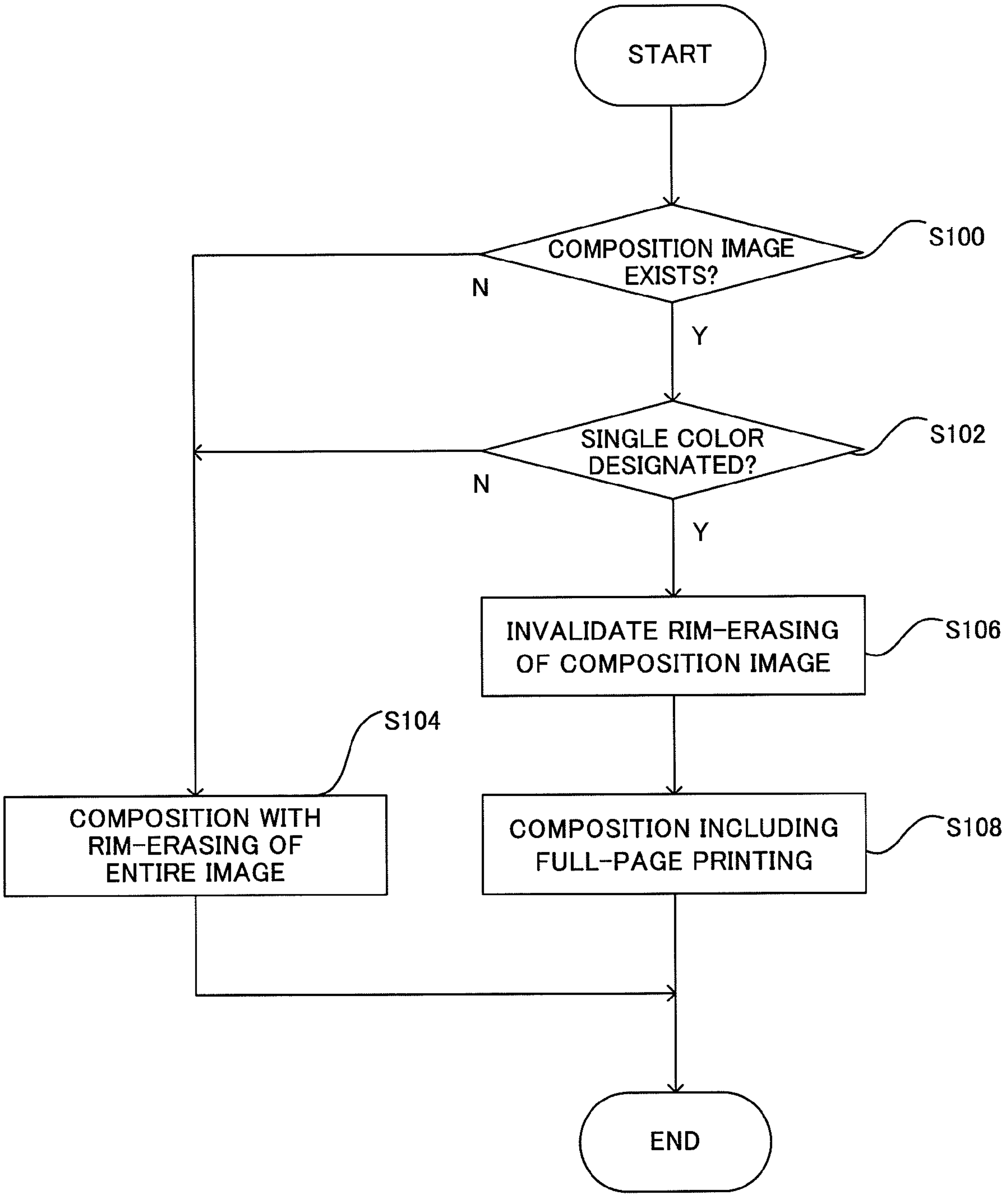
FIG. 5 is a flowchart showing an example of processing (S10) performed in execution of the image forming program by the image forming apparatus.

FIG. 5 is a flowchart showing an example of processing (S10) performed in execution of the image forming program 100 by the image forming apparatus 10.

As shown in FIG. 5, at step S100, the image forming apparatus 10 receives a print instruction to print a text image from e.g. the host computer 98, then determines whether or not a composition image to be composed with the text image exists in the print instruction. When a composition image to be composed exists in the print instruction, the process proceeds to step S102, and when there is no composition image, the process proceeds to step S104.

At step S102, the image forming apparatus 10 determines whether or not a single color is designated for the composition image. When a single color is designated, the process proceeds to step S106, and when a single color is not designated, the process proceeds to step S104.

At step S104, the image forming apparatus 10 performs image composition to perform rim-erasing on the entire print-instructed image.

At step S106, the image forming apparatus 10 invalidates the rim-erasing of the composition image.

At step S108, the image forming apparatus 10 performs image composition to include full-page printing based on the rim-erase invalidated composition image and the rim-erased text image.

Figure 6:
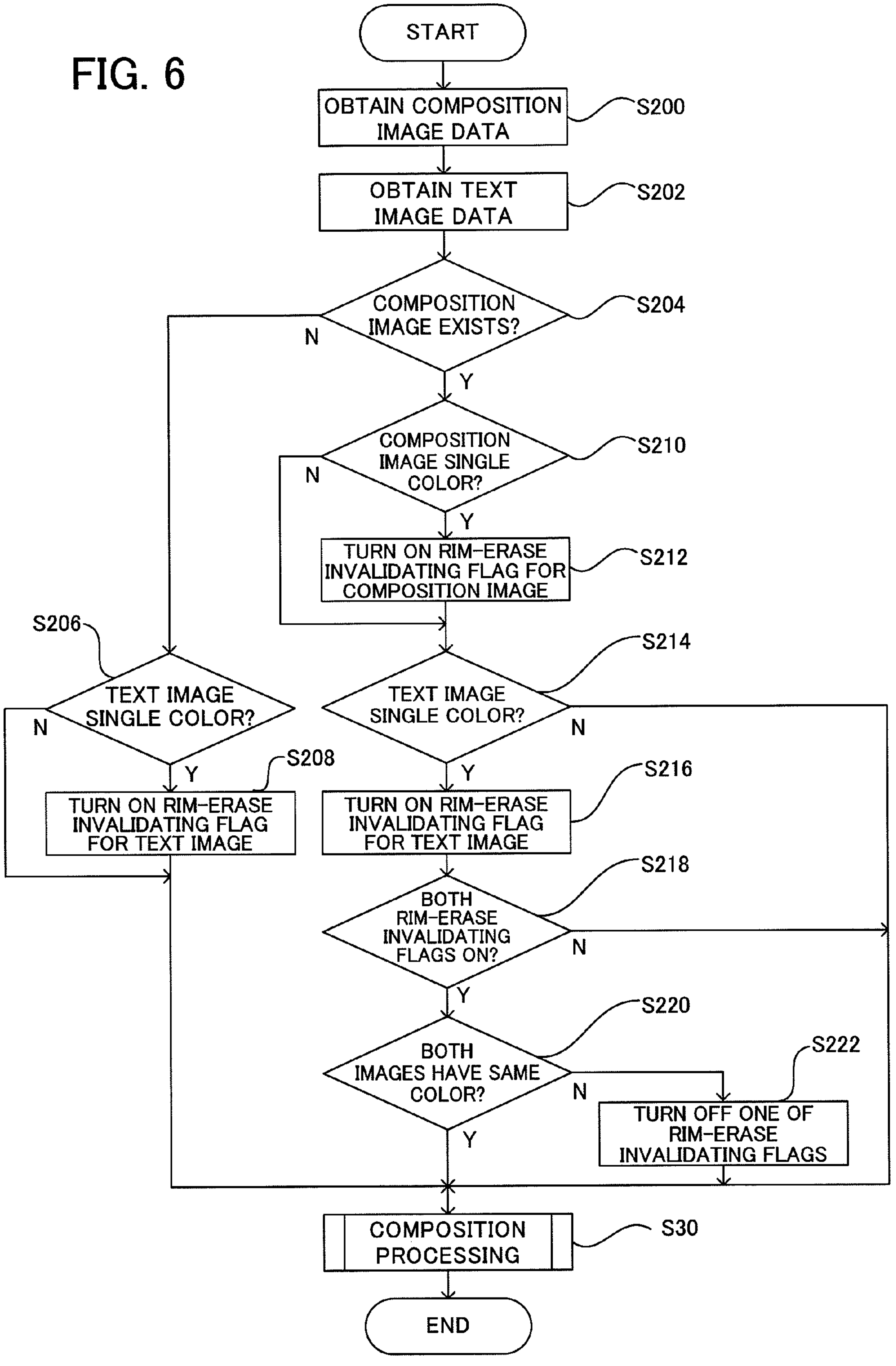
FIG. 6 is a flowchart showing other processing (S20) performed in composition of a text image with a composition image by the image forming apparatus.

FIG. 6 is a flowchart showing other processing (S20) performed in composition of a text image with a composition image by the image forming apparatus 10.

As shown in FIG. 6, at step S200, the image forming apparatus 10 obtains composition image data by e.g. generating a composition image.

At step S202, the image forming apparatus 10 obtains text image data together with a print instruction to print a text image.

At step S204, the image forming apparatus 10 determines whether or not the print instruction includes a composition image to be composed with the text image data obtained by the processing at step S202. When there is no composition image in the print instruction, the process proceeds to step S206, and when a composition image exists in the print instruction, the process proceeds to step S210.

At step S206, the image forming apparatus 10 determines whether or not the text image is a single color image. When the text image is a single color image, the process proceeds to step S208, and when the text image is not a single color image, the process proceeds to step S30.

At step S208, the image forming apparatus 10 turns on the rim-erase invalidating flag for the text image.

At step S210, the image forming apparatus 10 determines whether or not the composition image is a single color image. When the composition image is a single color image, the process proceeds to step S212, and when the composition image is not a single color image, the process proceeds to step S214.

At step S212, the image forming apparatus 10 turns on the rim-erase invalidating flag for the composition image.

At step S214, the image forming apparatus 10 determines whether or not the text image is a single color image. When the text image is a single color image, the process proceeds to step S216, and when the text image is not a single color image, the process proceeds to step S30.

At step S216, the image forming apparatus 10 turns on the rim-erase invalidating flag for the text image.

At step S218, the image forming apparatus 10 determines whether or not both the rim-erase invalidating flags of the text image and the composition image are on. When both the rim-erase invalidation flags are on, the process proceeds to step S220, otherwise, the process proceeds to step S30.

At step S220, the image forming apparatus 10 determines whether or not the color of the text image and that of the composition image are the same (in other words, the same single color). When the colors are not the same, the process proceeds to step S222, and when the colors are the same, the process proceeds to step S30.

At step S222, the image forming apparatus 10 turns off one of the rim-erase invalidating flags for the text image and the composition image.

Figure 7:
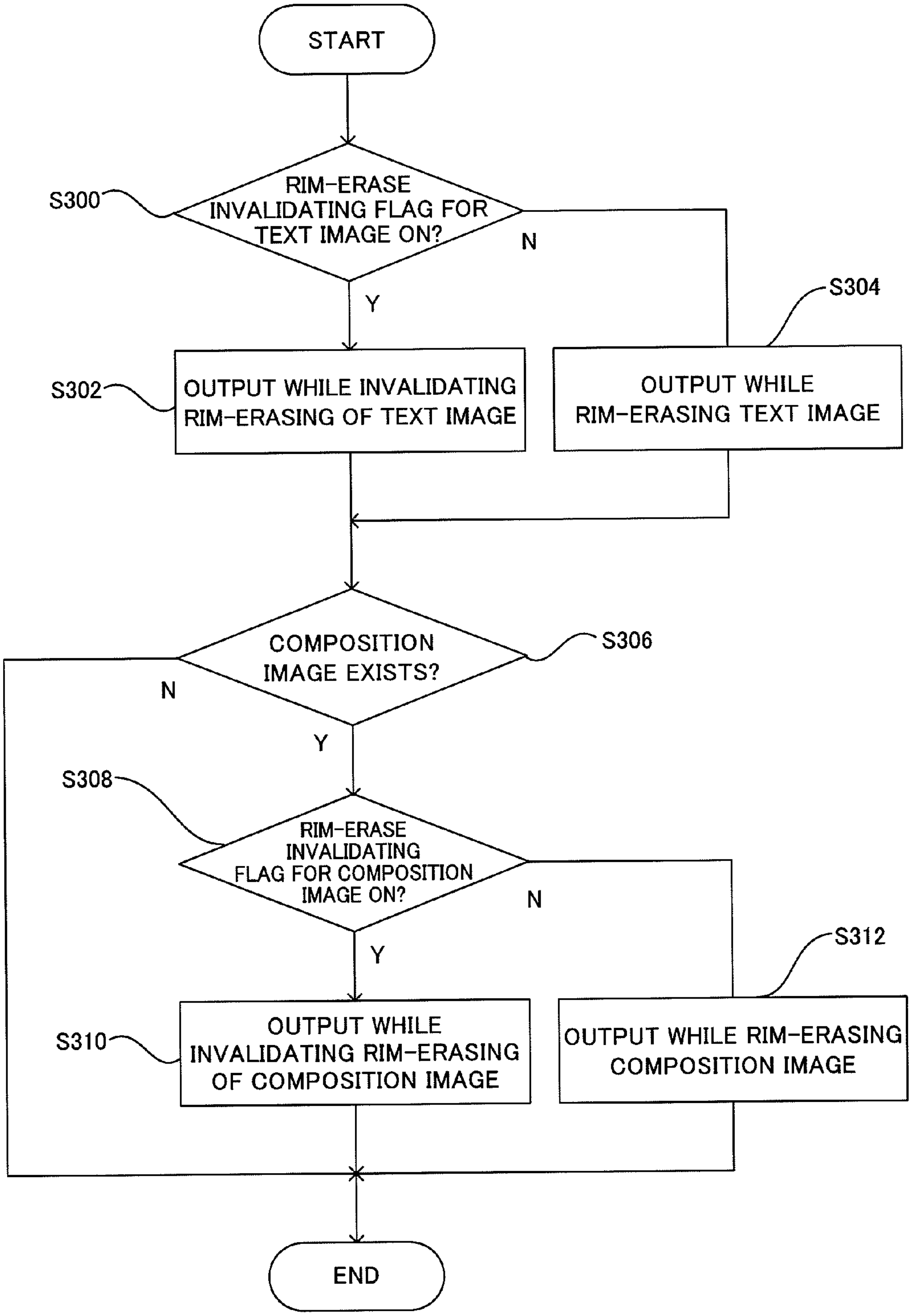
FIG. 7 is a flowchart showing composition processing (S30) in the processing at step S20 shown in FIG. 6.

FIG. 7 is a flowchart showing composition processing (S30) in the processing at step S20 shown in FIG. 6.

As shown in FIG. 7, at step S300, the image forming apparatus 10 determines whether or not the rim-erase invalidating flag for the text image is on. When the rim-erase invalidating flag is on, the process proceeds to step S302, and when the rim-erase invalidating flag is off, the process proceeds to step S304.

At step S302, e.g. the composition part 112 outputs a text image part of the composite image data while invalidating rim-erase processing on the text image.

At step S304, e.g. the composition part 112 outputs a text image part of the composite image data while performing rim-erase processing on the text image.

At step S306, the image forming apparatus 10 determines whether or not a composition image to be composed with the text image exists in the print instruction. When a composition image exists in the print instruction, the process proceeds to step S308, and when a composition image does not exist in the print instruction, the process the process ends.

At step S308, the image forming apparatus 10 determines whether or not the rim-erase invalidating flag for the composition image is on. When the rim-erase invalidating flag is on, the process proceeds to step S310, and when the rim-erase invalidating flag is off, the process proceeds to step S312.

At step S310, e.g. the composition part 112 outputs the composition image part of the composite image data while invalidating rim-erase processing on the composition image.

At step S312, e.g., the composition part 112 outputs the composition image part of the composite image data while performing rim-erase processing on the composition image.

Note that it may be arranged such that when a text image and a composition image are composed, the image forming apparatus 10 calculates the logical OR, the exclusive OR or the like of the images and generates a composite image.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a determination unit that determines whether a number of colors used for representing an image data is equal to or smaller than a predetermined number; and a controller that performs rim-erasing processing or invalidates the rim-erasing according to the determination by the determination unit, and forms an image on a recording medium, wherein the image data comprises a text image and a composition image, and the determination unit determines whether a number of colors used for representing the image data for formation of the text image on the recording medium is equal to or smaller than the predetermined number and determines whether a number of colors for representing the image data for formation of the composition image on a recording medium is equal to or smaller than the predetermined number, and when the determination unit determines that the number of colors for at least one of the text image and the composition image is equal to or smaller than the predetermined number, the controller forms an image on the recording medium based on one of the text image and the composition image in an area including at least a rim portion of the recording medium, and forms an image on the recording medium based on the other one of the text image and the composition image in an area other than the rim portion of the recording medium to which the image is outputted.

2. The image forming apparatus according to claim 1, wherein when the determination unit determines that the number of colors for one of the text image or the composition image not equal to or smaller than the predetermined number, the controller forms an image on the recording medium based on the one of the text image or the composition image, within an area other than a rim portion of the recording medium.

3. The image forming apparatus according to claim 1, wherein when the determination unit determines that the number of colors for the text image and the composition image are both not equal to or smaller than the predetermined number, the controller forms an image on the recording medium based on one of the text image or the composition image, and erases an area corresponding to a rim portion of the recording medium.

4. The image forming apparatus according to claim 1, further comprising:

an image area determination unit that determines whether a valid area of an image formed based on image data can be set within an area other than a rim portion of the recording medium, wherein when the determination unit determines that the number of colors for the text image and the composition image are both not equal to or smaller than the predetermined number, and when the image area determination unit determines that a valid area cannot be set within the area other than the rim portion of the recording medium, the controller forms the image, based on the text image and the composition image within the area other than the rim portion of the recording medium to which the image is to be outputted.

5. The image forming apparatus according to claim 1, further comprising:

a first acquisition unit that obtains first image data indicating an image corresponding to a size of the recording medium to which the image is to be outputted; and a second acquisition unit that obtains second image data indicating an image corresponding to a size of the recording medium to which the image is to be outputted, wherein the determination unit determines whether at least one of the first image data and the second image data are a single color.

6. The image forming apparatus according to claim 1, wherein the image data includes a code.

7. The image forming apparatus according to claim 1, wherein the predetermined number is 1.

8. The image forming apparatus according to claim 1, wherein the determination unit comprises:

a text image determination unit that performs a first determination to determine whether the number of colors used for representing image data for formation of the text image on the recording medium is equal to or smaller than the predetermined number, and a composition image determination unit that performs a second determination to determine whether the number of colors used to represent image data for formation of the composition image on the recording medium is equal to or smaller than the predetermined number, and the controller performs the rim-erasing processing according to both the first determination and the second determination.

9. The image forming apparatus according to claim 1, wherein the determination unit determines the number of uses of toner colors over the whole image.

10. An image forming apparatus according to claim 1, wherein the controller invalidates the rim-erasing when a number of colors used for representing an image data is equal to or smaller than a predetermined number.

11. An image forming apparatus according to claim 1, wherein the image data comprises a text image and a composition image, the determination unit determines whether a number of colors used for representing each of the text image and the composition image is equal to or smaller than a predetermined number, and the controller invalidates the rim-erasing for the composition image when a number of color used for representing the composition image is equal to or smaller than a predetermined number, and invalidates the rim-erasing for the text image when a number of color used for representing the text image is equal to or smaller than a predetermined number.

12. An image forming method comprising:

determining whether a number of colors used for representing image data is equal to or smaller than a predetermined number; and performing rim-erasing processing or invalidating the rim-erasing, according to the determination, and forming an image on a recording medium, wherein the image data comprises a text image and a composition image, and the determining comprises determining whether a number of colors used for representing the image data for formation of the text image on the recording medium is equal to or smaller than the predetermined number and whether a number of colors for representing the image data for formation of the composition image on a recording medium is equal to or smaller than the predetermined number, and when the number of colors for at least one of the text image and the composition image is determined to be equal to or smaller than the predetermined number, forming an image on the recording medium based on one of the text image and the composition image in an area including at least a rim portion of the recording medium, and forming an image on the recording medium based on the other one of the text image and the composition image in an area other than the rim portion of the recording medium to which the image is outputted.

13. A non-transitory computer readable medium storing a program causing a computer to execute a process for image formation, the process comprising:

determining whether a number of colors used for representing image data is equal to or smaller than a predetermined number; and performing rim-erasing processing or invalidating the rim-erasing, according to the determination, and forming an image on a recording medium, wherein the image data comprises a text image and a composition image, and the determining comprises determining whether a number of colors used for representing the image data for formation of the text image on the recording medium is equal to or smaller than the predetermined number and whether a number of colors for representing the image data for formation of the composition image on a recording medium is equal to or smaller than the predetermined number, and when the number of colors for at least one of the text image and the composition image is determined to be equal to or smaller than the predetermined number, forming an image on the recording medium based on one of the text image and the composition image in an area including at least a rim portion of the recording medium, and forming an image on the recording medium based on the other one of the text image and the composition image in an area other than the rim portion of the recording medium to which the image is outputted.

* * * * *